US007542762B2

(12) United States Patent
Uchida et al.

(10) Patent No.: US 7,542,762 B2
(45) Date of Patent: Jun. 2, 2009

(54) WIRELESS COMMUNICATION SYSTEM AND TEST METHOD THEREOF, AND ACCESS TERMINAL FOR TESTING WIRELESS COMMUNICATION SYSTEM

(75) Inventors: Tsutomu Uchida, Yokohama (JP); Koji Hayata, Yokohama (JP); Hideo Aoe, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 0 days.

(21) Appl. No.: 11/022,139

(22) Filed: Dec. 21, 2004

(65) Prior Publication Data

US 2006/0019651 A1    Jan. 26, 2006

(30) Foreign Application Priority Data

Jul. 21, 2004  (JP)  ............................. 2004-212451
Nov. 26, 2004  (JP)  ............................. 2004-341379

(51) Int. Cl.
*H04Q 7/20*  (2006.01)

(52) U.S. Cl. ..................................................... 455/423

(58) Field of Classification Search ................. 455/423, 455/561, 424, 450, 67.1, 453, 57.1
See application file for complete search history.

(56) References Cited

U.S. PATENT DOCUMENTS

| 5,913,041 | A  | * | 6/1999  | Ramanathan et al. ........ 709/233 |
| 6,467,055 | B1 | * | 10/2002 | Katuszonek ................. 714/43  |
| 6,941,137 | B2 |   | 9/2005  | Park                               |

| 2003/0224777 | A1 | * | 12/2003 | Sakuma ....................... 455/423 |
| 2004/0077344 | A1 | * | 4/2004  | Bernasconi et al. ......... 455/423 |
| 2005/0107080 | A1 | * | 5/2005  | Hasegawa et al. ........... 455/423 |
| 2006/0105763 | A1 | * | 5/2006  | Lipsit ......................... 455/423 |

FOREIGN PATENT DOCUMENTS

| JP | 10108244        | 4/1998  |
| JP | 2002-271280     | 9/2002  |
| JP | 2003-124866     | 4/2003  |
| KR | 10-2003-0078291 | 10/2003 |

OTHER PUBLICATIONS

IETF RFC 792, Network Working Group, Internet Control Message Protocol, Darpa Internet Program Protocol Specification, Sep. 1981.
IETF RFC 959, Network Working Group, File Transfer Protocol (FTP), Oct. 1985.

* cited by examiner

*Primary Examiner*—Melody Mehrpour
(74) *Attorney, Agent, or Firm*—Townsend and Townsend and Crew LLP

(57) ABSTRACT

A wireless communication system and its test method capable of executing a test of the wireless communication apparatus from a remote place by using a terminal generally used in wireless communication systems are implemented with a low-cost configuration and a simple procedure. A terminal obtained by installing a test AP on a general terminal that is used in general wireless communication systems and that can execute APs via a communication network is placed in a coverage area of a wireless communication apparatus. A maintenance center for the wireless communication system activates the terminal. The terminal executes the test AP and conducts communication with the maintenance center by using control signals and test signals for testing wireless communication system. A test is executed by measuring an actual communication state of the wireless communication system.

11 Claims, 11 Drawing Sheets

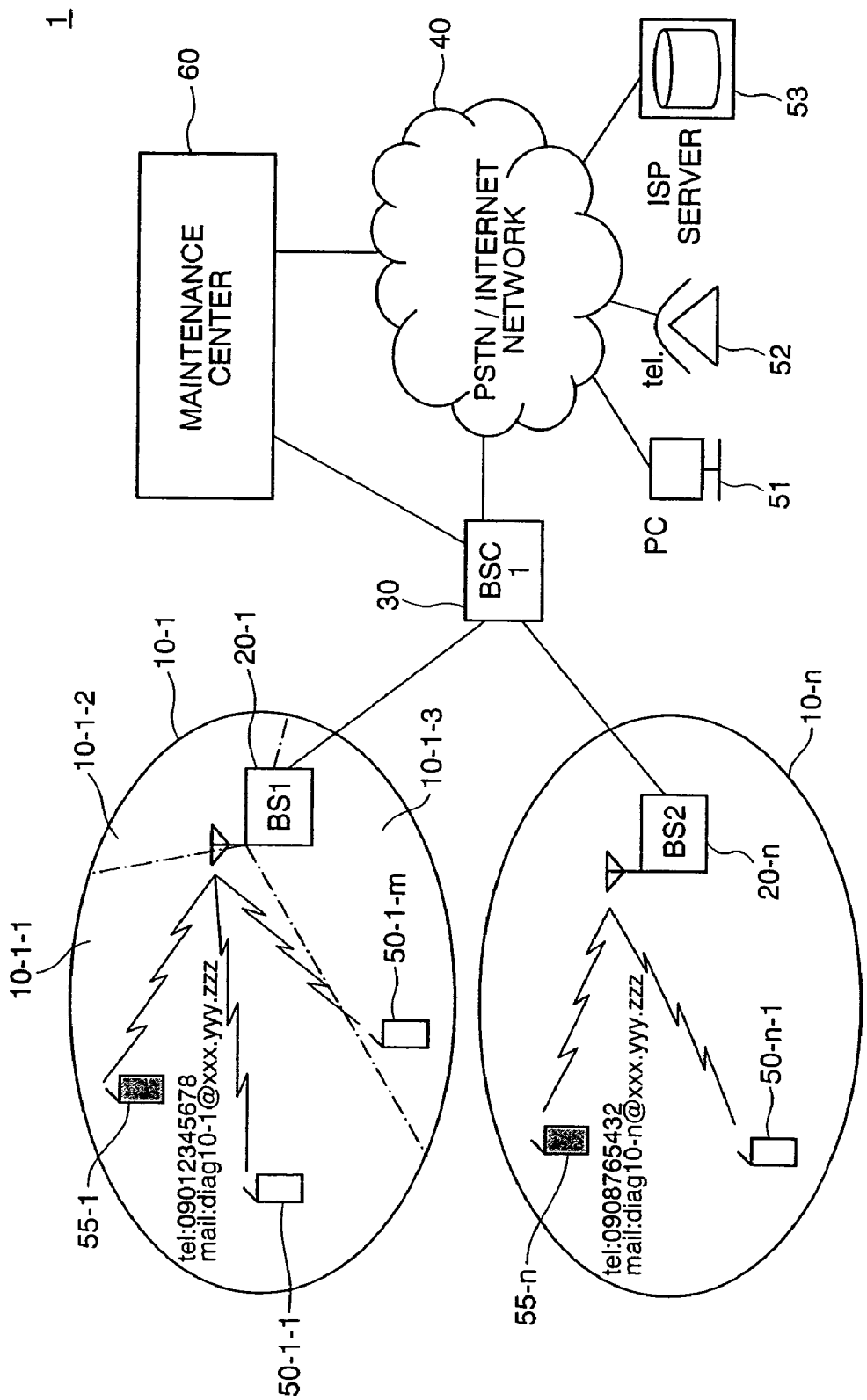

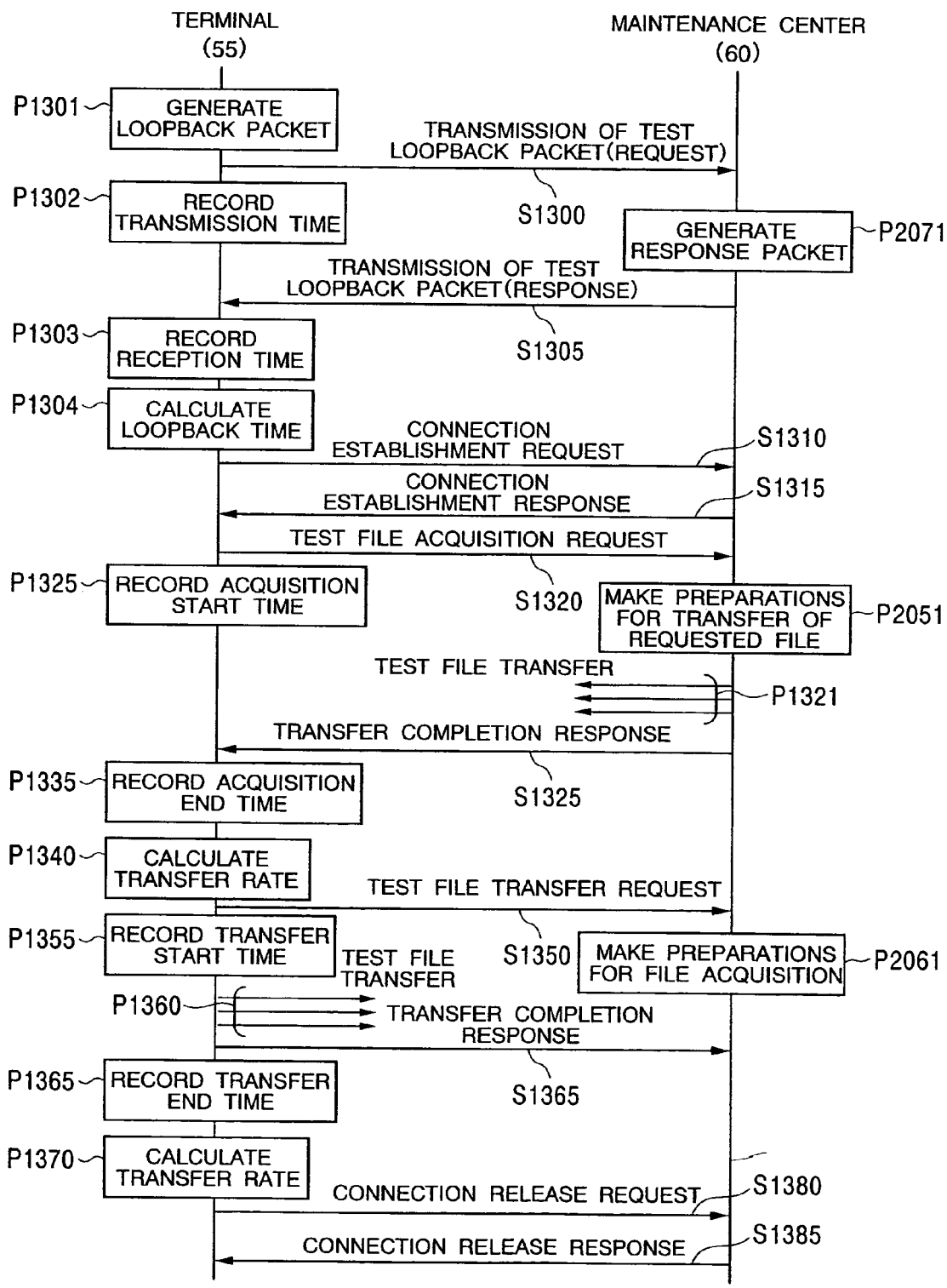

FIG.10

| DATA CONTENTS | VALUE | |
|---|---|---|
| LOCAL TERMINAL INFORMATION(TELEPHONE NUMBER) | 09012345678 | 5610 |
| ACQUISITION PILOT | 128 | 5611 |
| AMEASURED DATA OF LOOPBACK DELAY | | |
| LOOPBACK PACKET TRANSMISSION TIME (TOTAL SECONDS) | 9180538(ms) | 5620 |
| LOOPBACK PACKET RECEPTION TIME (TOTAL SECONDS) | 9180541(ms) | 5621 |
| LOOPBACK PACKET TIME DIFFERENCE | 3(ms) | 5622 |
| MEASURED DATA OF REVERSE DIRECTION TRANSFER RATE | | |
| TEST FILE TRANSFER START TIME (TOTAL SECONDS) | 9187689(ms) | 5630 |
| TEST FILE TRANSFER END TIME (TOTAL SECONDS) | 9187831(ms) | 5631 |
| TEST FILE TRANSFER TIME | 142(ms) | 5632 |
| TEST FILE SIZE | 10000(byte) | 5633 |
| REVERSE DIRECTION TRANSFER RATE | 70.42(kbps) | 5634 |
| MEASURED DATA OF FORWARD DIRECTION TRANSFER RATE | | |
| TEST FILE ACQUISITION START TIME (TOTAL SECONDS) | 9183016(ms) | 5640 |
| TEST FILE ACQUISITION END TIME (TOTAL SECONDS) | 9183133(ms) | 5641 |
| TEST FILE ACQUISITION TIME | 117(ms) | 5642 |
| TEST FILE SIZE | 150000(byte) | 5643 |
| FORWARD DIRECTION TRANSFER RATE | 1282.05(kbps) | 5644 |

(Table reference: 5600)

FIG.11

| TERMINAL | ITEM | | RESULT | | | |
|---|---|---|---|---|---|---|
| | | | LATEST | AVERAGE | MAXIMUM | MINIMUM |
| 09012345678 | MEASUREMENT TIME | | 7/4 4:00:00 | | 6/18 4:00:00 | 6/30 4:00:00 |
| | PACKET DELAY(ms) | | 3 | 2.81 | 5 | 1 |
| | REVERSE DIRECTION TRANSFER RATE(kbps) | | 70.42 | 68.15 | 81.62 | 59.84 |
| | FORWARD DIRECTION TRANSFER RATE(kbps) | | 1282.05 | 1185.64 | 2004.78 | 650.15 |
| | ACQUISITION PILOT | | 128 | | 128 | 128 |
| 09098765432 | MEASUREMENT TIME | | 7/4 4:00:02 | | 6/23 4:00:02 | 7/1 4:00:02 |
| | PACKET DELAY(ms) | | 2 | 1.79 | 3 | 1 |
| | REVERSE DIRECTION TRANSFER RATE(kbps) | | 110.86 | 105.68 | 132.54 | 89.16 |
| | FORWARD DIRECTION TRANSFER RATE(kbps) | | 1891.68 | 1954.28 | 2315.29 | 1754.43 |
| | ACQUISITION PILOT | | 132 | | 132 | 132 |
| 08013579246 | MEASUREMENT TIME | | 7/4 4:02:10 | | 6/3 4:02:10 | 6/29 4:02:10 |
| | PACKET DELAY(ms) | | 4 | 3.78 | 6 | 3 |
| | REVERSE DIRECTION TRANSFER RATE(kbps) | | 45.81 | 52.86 | 38.19 | 70.48 |
| | FORWARD DIRECTION TRANSFER RATE(kbps) | | 986.43 | 1051.95 | 1385.64 | 859.31 |
| | ACQUISITION PILOT | | 104 | | 104 | 104 |

WIRELESS COMMUNICATION SYSTEM AND TEST METHOD THEREOF, AND ACCESS TERMINAL FOR TESTING WIRELESS COMMUNICATION SYSTEM

INCORPORATION BY REFERENCE

The present application claims priority from Japanese applications JP 2004-212451 filed on Jul. 21, 2004 and JP 2004-341379 filed on Nov. 26, 2004, the contents of which are hereby incorporated by reference into this application.

BACKGROUND OF THE INVENTION

The present invention relates to a configuration and a test method of a wireless communication system.

Besides the conventional wire communication network, introduction of a wireless communication network (hereafter referred to as wireless communication system) using access terminals and wireless communication apparatuses is advancing. In the wireless communication system, CDMA (Code Division Multiple Access) communication in which a signal of voice or the like is subject to code multiplexing with the spreading code to conduct communication is spread, besides the TDMA (Time Division Multiple Access) communication in which a signal of voice or the like is subject to time division multiplexing to conduct communication. It has thus become possible to conduct communication with anyone anywhere anytime.

In order to further spread such a wireless communication system, it is necessary for the system provider not only to increase the number of wireless communication apparatuses for connecting access terminals (hereafter referred to as terminals) of increasing users (referred to as subscribers as well), but also to suitably conduct software addition or software update on already installed communication apparatuses such as wireless communication apparatuses and thereby improve/enhance contents of communication service provided by the communication system.

The wireless communication system conducting the hardware addition and software update of the communication apparatus as described above needs a test technique (maintenance technique) for confirming the normal performance of the wireless communication system having a new configuration each time hardware is added and software is updated in the communication apparatus, in order to secure the reliability, security and service providing capability (hereafter referred to as serviceability) of the system.

As a matter of course, a periodical diagnoses and maintenance including preventive maintenance become necessary to secure the reliability, security and serviceability, even at the time of ordinary operation other than the time of hardware addition or the software update. Therefore, various configurations and test methods of wireless communication systems have been proposed to secure the reliability, security and serviceability (see, for example, JP-A-2003-124866, JP-A-2002-271280 and JP-A-10-108244).

SUMMARY OF THE INVENTION

In the wireless communication system, access terminals conduct communication via a base station in an area called cell. By the way, the cell is an area obtained by prescribing the range in which the radio wave emitted from a base station, which is a wireless communication apparatus, reaches access terminals. A cell generally has a range of several km in radius around a base station.

In other words, if each cell is compared with the conventional wire communication network (switched network), the number of users (or terminals) that can be accommodated in the cell is smaller and a cover area of each cell is remarkably small. For providing communication service in a wide range in the wireless communication system, therefore, it is necessary to dispose a large number of base stations in a wide range. In the method of making a test of the communication network by dispatching a maintenance engineer to each cell associated with a base station and carrying a terminal and a tester in the cell, remarkable human resources are used and consequently the cost required to sustain the communication system increases and finally the fee and charge of users are also affected.

Therefore, a wireless communication system in which an automatic remote test can be made from a maintenance center or the like is wanted.

In a test method disclosed in JP-A-2003-124866, a test program is downloaded to a terminal and a test is automatically made. In this test method, however, a test of only the terminal itself is made, and it is often necessary to dispatch a maintenance engineer to a cell to make a test of a wireless communication apparatus.

On the other hand, in a test method disclosed in JP-A-2002-271280, the base station has special terminals for testing and an automatic test of the communication system (especially the base station) from a remote place is made possible. Since special apparatuses, i.e., the special terminals are needed, however, the test method lacks versatility. In addition, for example, for implementing the test method, a high-frequency cable becomes necessary. In addition, a scheme for preventing other radio waves other than a radio wave emitted by a specific base station from being received and a scheme for preventing transmission to base stations other than a specific base station being conducted are needed. When increasing test terminals, these schemes become necessary for each of the terminals. Furthermore, since special terminals need to be provided in the base station, a somewhat increase in the communication system cost is inevitable even if the purchase unit price is lowered by introducing the special terminals into the base station in large quantities.

In a test method disclosed in JP-A-10-108244, the base station has special terminals for testing and an automatic test of the communication system from a remote place is made possible. However, operation of terminals conducted by a maintenance engineer dispatched to the base station is needed.

It is desired to provide in a wireless communication system a configuration of a wireless system and its test method having an excellent test capability such that a test of a wireless communication apparatus can be executed from a remote place while suppressing the introduction of special apparatuses and dispatch of maintenance engineers to the cell to the utmost.

In view of the problems heretofore described, the present invention has been conceived. An object of the present invention is to implement a wireless communication system and its test method capable of executing a test of a wireless communication apparatus from a remote place.

Another object of the present invention is to implement a wireless system and its test method having a high test capability that use terminals generally used in wireless communication systems without introducing special apparatuses.

Still another object of the present invention is to implement the system and method with a simple and low-cost configuration and a simple procedure. The wireless communication system may be a system that provides voice communication or may be a system that provides packet communication. The wireless communication system may be a system that provides both the voice communication and the packet communication.

To achieve above purposes of the present invention, in a general terminal generally used in a wireless communication system, the present invention notices that an application program (hereafter referred to as AP) arbitrarily installed on a terminal can execute a communication function via a communication network by using an operating system (hereafter referred to as OS) and an application platform (hereafter referred to as APPF) installed on the terminal.

For example, an AP for testing a wireless communication network (especially, a wireless communication apparatus) is installed on a terminal that can apply to communication services such as "i-appli" as a registered trade mark of NTT DoCoMo, Inc. and "EZ Appli" as a registered trade mark of KDDI Corporation.

A communication system is configured in that a terminal can execute a communication function via a communication network by using an operating system (hereafter referred to as OS) and an application platform (hereafter referred to as APPF) installed on the terminal.

In other words, the present invention realizes to implement a test of a wireless communication system having a general terminal executing an application program for executing a test of the wireless communication network (especially, the wireless communication device).

Specifically, in a wireless communication system according to the present invention, a terminal obtained by installing a test AP on a general terminal that is used in general wireless communication systems and that can execute APs via a communication network is placed in a coverage area of a wireless communication apparatus. When a maintenance center for the wireless communication system has activated the terminal, the terminal executes the test AP. The terminal conducts communication the maintenance center by using control signals and test signals for test, and thereby executes a test of the wireless communication system.

More particularly, in a wireless communication system according to the present invention, a terminal obtained by installing an AP for executing a test of the wireless communication system on a general terminal, which is used in general wireless systems and which can execute an AP, is placed in a coverage area of a wireless communication apparatus. When a test program in the maintenance center for the wireless communication system has activated the terminal, the terminal executes a test AP and measures the communication state in the wireless communication system, such as a signal delay and a transmission rate, in a process of communication of control signals and test signals for test the maintenance center. The terminal notifies the maintenance center of an actual measurement result obtained at the terminal. As a result, a test of the wireless communication system can be executed.

By the way, the connection between the terminal and the maintenance center is established when the test AP is activated in the same way as when the general terminal executes an AP with another terminal, and the connection is released when the test AP is finished.

The test terminal placed in the coverage area of the wireless communication apparatus is a general terminal which is used in the general wireless communication systems and which can execute an AP. The general terminal has an AP for transmitting and receiving a control signal and test signal for test the maintenance center, measuring the communication state of the wireless communication system, and notifying the maintenance center of a result of the measurement.

The wireless communication system according to the present invention can execute a test of the wireless communication by transmitting and receiving the control signals and test signals for test between the terminal obtained by adding an AP to a general terminal and the maintenance center in accordance with a procedure similar to that of ordinary communication, without making a change in facilities used in the general wireless communication system.

In other words, the wireless communication system according to the present invention can execute a test of the wireless communication system by using a low-cost configuration using a terminal and an apparatus generally used in wireless communication systems and a simple procedure, without introducing a special apparatus into the wireless communication system.

In addition, the wireless communication system according to the present invention executes a test of a wireless communication apparatus from a remote place by using a generally used terminal without introducing a special apparatus. Therefore, the wireless communication system and its test method can be implemented by using a low-cost configuration and a simple procedure.

BRIEF DESCRIPTION OF THE DRAWINGS

FIG. 1 is a system configuration diagram showing a configuration example of a wireless communication system;

FIG. 9 is a sequence diagram showing a test operation example conducted between a terminal and a maintenance center;

FIG. 10 is a memory map or memory table diagram showing a configuration example of data (relating to a test) stored in a memory on a terminal; and FIG. 11 is a memory map or memory table diagram showing a configuration example of data (relating to a test) stored in a memory in a maintenance center or a server.

DETAILED DESCRIPTION OF THE INVENTION

Figure 2A:
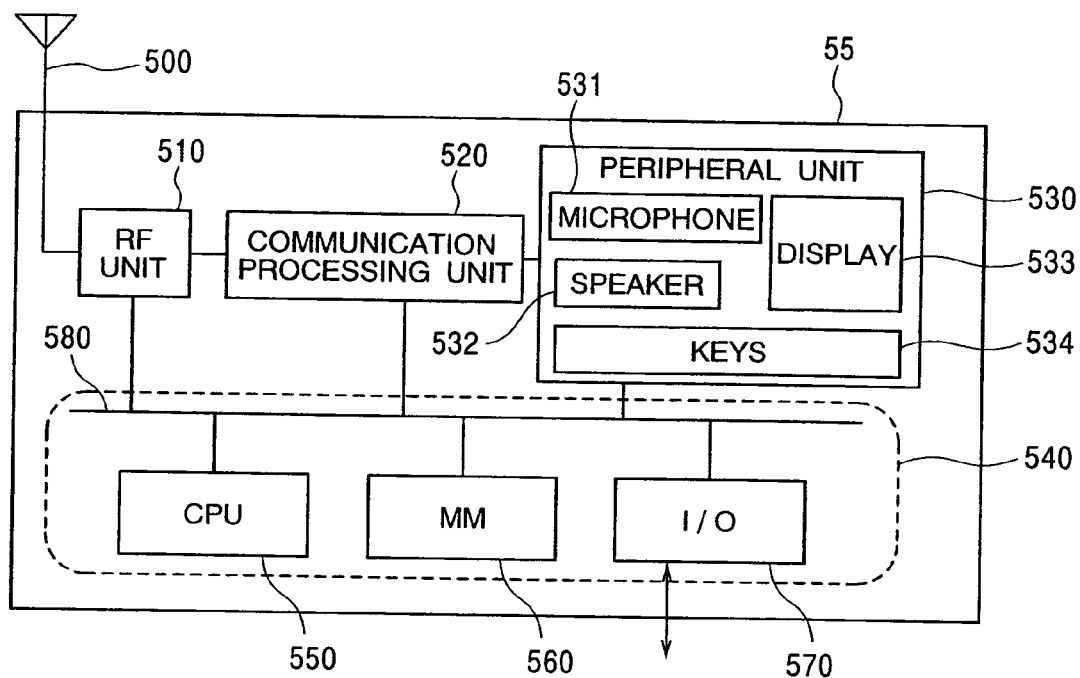
FIG. 2A is a block diagram showing a hardware configuration example of a test terminal.

Hereafter, embodiments of a configuration of a wireless communication system according to the present invention, its test method, and a configuration of a terminal apparatus used to make a test of the wireless communication system will be described with reference to the drawings.

Hereafter, they will be described in detail by mainly taking a wireless communication system that provides packet communication as an example.

FIG. 1 is a system configuration diagram showing a configuration example of a wireless communication system. A wireless communication system 1 includes a base station (hereafter referred to as BS) 20 serving as a wireless communication apparatus which conducts communication with terminals 50; a base station controller (hereafter referred to as BSC) 30 which conducts connection with the BS 20, connection with a PSTN/Internet (hereafter referred to collectively as PSTN) 40 serving as another communication network, and management and control of the BS 20; and a maintenance center 60 connected to the BSC 30 and the PSTN 40 to conduct maintenance and management of the wireless communication system 1.

A plurality of BSs 20-1 to 20-n are respectively wireless-connected to a plurality of terminals 50-1-1 to 50-n-1 which are respectively present in coverage areas referred to as cells 10-1 to 10-n. As appreciated by referring to FIG. 1, a plurality of terminals (for example, terminals 50-1-1 to 50-1-m) may be present in one cell (for example, the cell 10-1). In such a case, the terminals are wireless-connected to one BS (for example, BS 20-1).

In some cases, each cell is further divided into small areas referred to as sectors 10-1-1 to 10-1-3, and terminals and a BS are operated in each sector. Each terminal 50 is connected to a data terminal PC 51, a telephone terminal "tel" 52 or an ISP (Internet Service Provider) server 53 connected to the PSTN 40 via the BS 20, the BSC 30 and the PSTN 40 to conduct transmission and reception (communication) of data or voice.

The wireless technique used in the cell 10 may be any wireless technique such as the TDMA, CDMA, or FDMA.

A terminal 55 (55-1 and 55-n) placed in each cell 10 is a terminal for test having a function of implementing the test method of the wireless communication system according to the present invention. The terminal 55 is a test terminal obtained by adding the test function of the wireless communication system 1 to the generally used terminal 50. As described later, the terminal 55 is connected to the maintenance center 60 via the BS 20 and the BSC 30 (and, in some cases, the PSTN 40 as well). And the terminal 55 makes a test of the wireless communication system 1 in the process of communication (transmission and reception of control signals and test signals) with the maintenance center 60.

By the way, each of the test terminals 55 is provided with a telephone number and a mail address in the same way as the general terminals 50 as illustrated, and each of the test terminals 55 can work in the same way as the generally used terminals.

Figure 2B:
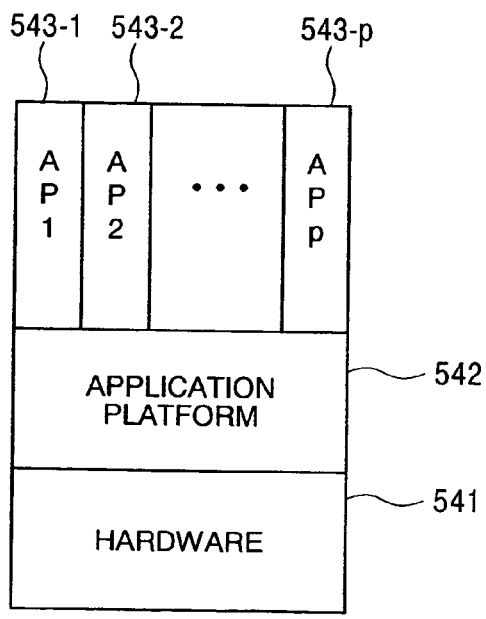
FIG. 2B is a block diagram showing a software configuration example of a test terminal.

FIGS. 2A and 2B are block diagrams showing a configuration example of a test terminal 55. FIG. 2A is a block diagram showing a hardware configuration of the test terminal 55, and its configuration is the same as that of the general terminals 50.

Specifically, the test terminal 55 includes an antenna 500 for transmitting and receiving radio signals, an RF unit 510 for converting a radio signal to a baseband signal, a communication processing unit 520 for conducting predetermined communication processing (such as signal termination, protocol conversion, and failure monitoring) on the baseband signal, a peripheral unit 530 for inputting and outputting signals transmitted and received by the terminal owner, and a control unit 540 for controlling the whole of the terminal 55.

The peripheral unit 530 includes a microphone 531 for inputting voice, a speaker 532 for outputting voice, a display 533 for displaying characters and an image, and an input apparatus (such as keys) 534 for inputting data and control signals (such as specification of the connection destination).

The control unit 540 includes a CPU 550 serving as a processor for controlling operation of the whole terminal 55, an MM 560 serving as a memory for storing an operation program and various data required for the operation, and an I/O 570 for transmitting/receiving signals to/from an external device. A control line 580 connects the above-described blocks 510 to 570 to each other.

As shown in FIG. 1, the terminal 55 is generally placed in a predetermined position in the cell 10, and connected to a specific cell (or sector). The terminal 55 is always supplied with power and made ready to operate (of course, the terminal 55 can also be moved).

The terminal 55 is a terminal based on the general terminal 50, and the MM 560 has a program for testing the wireless communication system 1. The terminal 55 makes possible a test of the wireless communication system 1 described later merely by execution of the program conducted by the CPU 550.

FIG. 2B is a block diagram showing a software configuration of the terminal 55. Its configuration is nearly the same as that of the general terminals 50.

The general access terminal 50 includes a terminal OS 541 and an APPF 542. Various APs 534 operate on them to implement various communication services. For example, AP1 543-1 is an application program for weather forecast, and AP2 543-2 is an application program for game. The terminal owner suitably operates the peripheral unit 530, selects a desired program, activates this program via the wireless communication system 1, and enjoys communication service. In the terminal 55 according to the present invention, an application program APp for test 543-p described hereafter in detail is installed in the terminal and a test of the wireless communication system 1 is executed while cooperating with the maintenance center 60. As for the APp 543-p setting, the terminal may be placed in a predetermined position in the cell 10 after the maintenance center 60 previously conducted setting in the terminal 55, or the setting may be conducted after the terminal 55 is placed and the program is downloaded.

In other words, the terminal 55 is a terminal that makes it possible to make a test of the wireless communication system with a low-cost configuration and a simple procedure using the terminals generally used in wireless communication systems without introducing a special apparatus into the wireless communication system.

Figure 3:
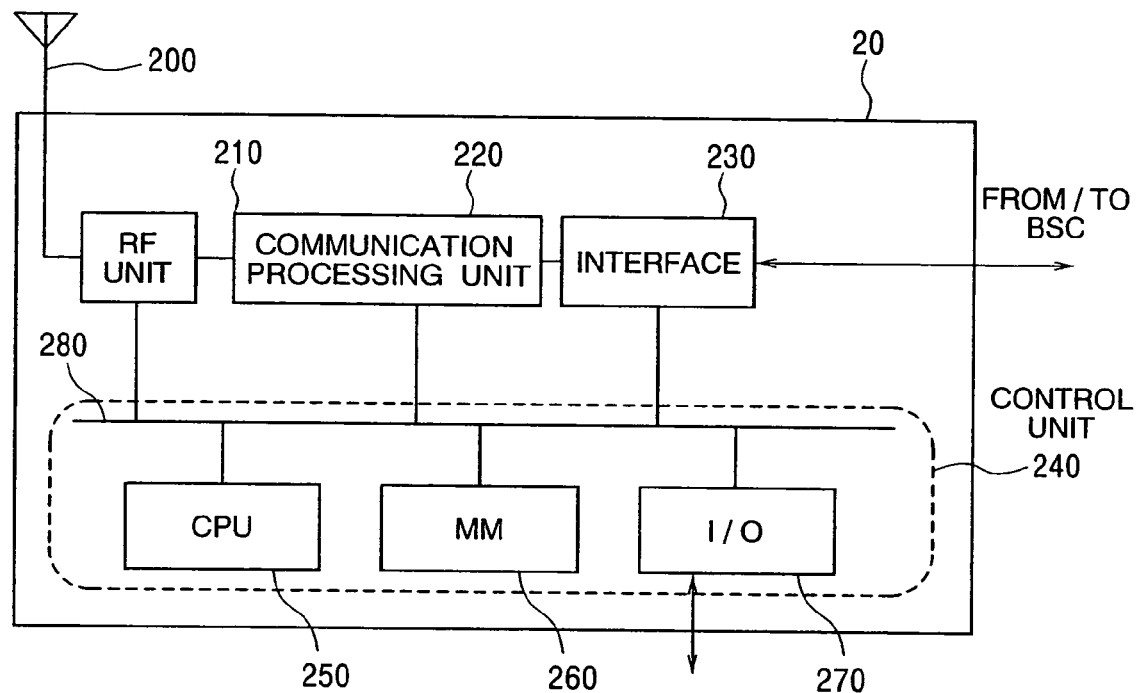
FIG. 3 is a block diagram showing a configuration example of a wireless communication apparatus (base station BS)

FIG. 3 is a block diagram showing a configuration example of the wireless communication apparatus (the base station BS 20). Its configuration is the same as the configuration of generally used base stations. Specifically, the wireless communication apparatus (the base station BS 20) includes an antenna 200 for transmitting and receiving radio signals, an RF unit 210 for converting a radio signal to a baseband signal, a communication processing unit 220 for conducting predetermined communication processing (such as signal termination, protocol conversion, and failure monitoring) on the baseband signal, an interface 230 for transmitting/receiving a signal to/from the BSC 30, and a control unit 240 for controlling the whole of the BS 20.

The control unit 240 includes a CPU 250 serving as a processor for controlling operation of the whole BS 20, an MM 260 serving as a memory for storing an operation program and various data required for the operation, and an I/O 270 for transmitting/receiving signals to/from an external device.

A control line 280 connects the above-described blocks 210 to 270 to each other. The I/O 270 is connected to the I/O 570 in the terminal 55, and used when controlling the BS 20 in the test operation of the wireless communication system 1. For example, the I/O 270 is used when controlling the cell 10 (when specifying the range (size) or a sector in the cell).

Figure 4:
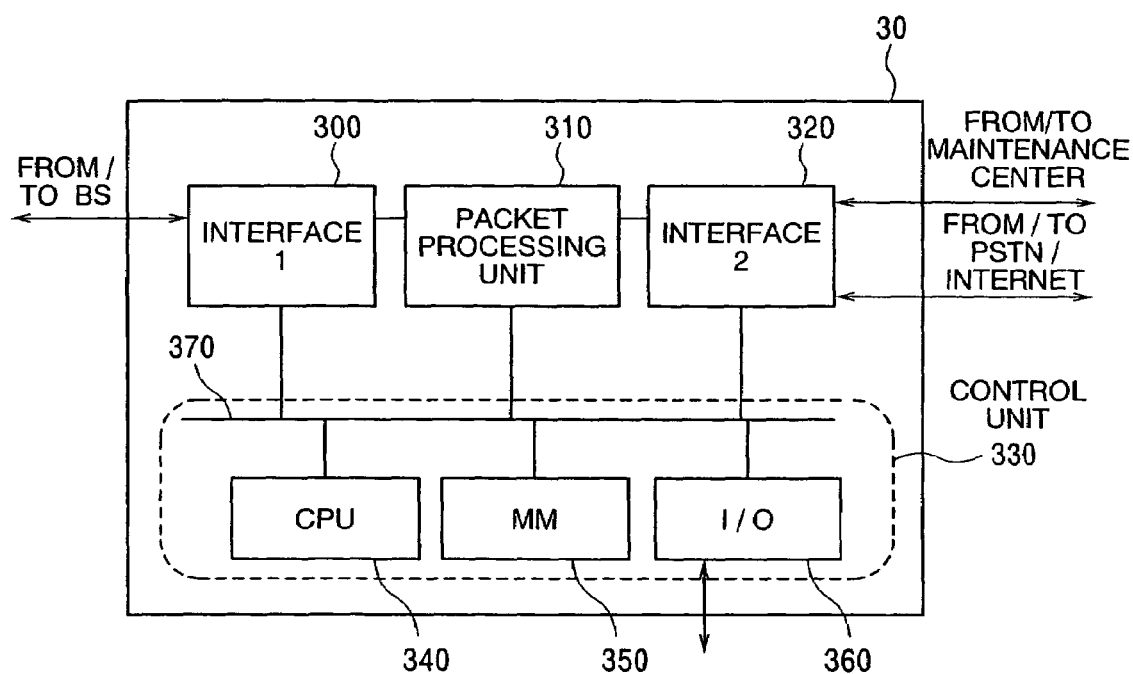
FIG. 4 is a block diagram showing a configuration example of a base station controller (BSC)

FIG. 4 is a block diagram showing a configuration example of the BSC 30. Its configuration is the same as that of the generally used BSC. Specifically, the BSC 30 includes an interface 300 to the BS 20, an interface 320 to the PSTN 40 and the maintenance center 60, a packet processing unit 310 for conducting signal processing such as switching on signals transmitted and received between these interfaces, and a control unit 330 for controlling the whole BSC 30.

The control unit 330 includes a CPU 340 serving as a processor for controlling operation of the whole BSC 30, an MM 350 serving as a memory for storing an operation program and various data required for the operation, and an I/O 360 for transmitting/receiving signals to/from an external device. A control line 370 connects the above-described blocks 300 to 360 to each other.

The wireless communication system 1 according to the present invention is a system obtained by adding the BS 20 and the BSC 30 according to the present invention as described above to the general wireless communication system using the general BS and BSC. In the present invention system, controls signals and test signals for test are transmitted and received between the terminal 55 and the maintenance center 60 to execute a test of the wireless communication system. In other words, in the wireless communication system 1 according to the present invention, a test of the wireless communication system can be executed with a low-cost configuration using terminals and apparatuses generally used in wireless communication systems and with a simple procedure, without introducing a special apparatus into the wireless communication system.

Figure 5:
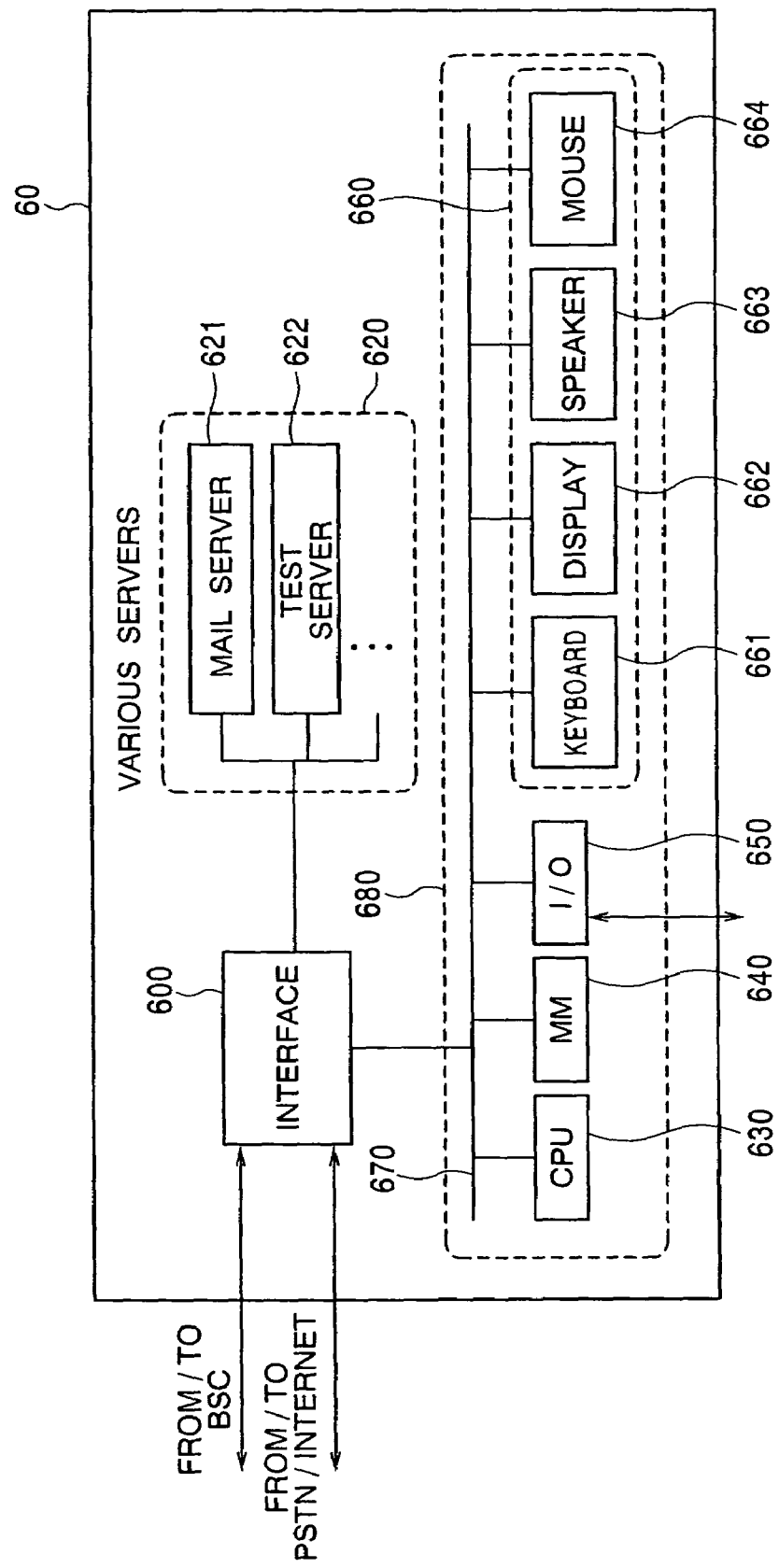
FIG. 5 is a block diagram showing a configuration example of a maintenance center.

FIG. 5 is a block diagram showing a configuration example of the maintenance center 60. The maintenance center 60 manages the state of facilities (such as the BS 20, the BSC 30, the terminal 50 and the PSTN 40), and conducts management and operation, such as charge to a terminal, dealing with an enquiry from a subscriber, and a maintenance order, on the wireless communication system 1.

Specifically, the maintenance center 60 includes an interface 600 for transmitting/receiving various signals such as monitoring and control signals to/from the BSC 30 and the PSTN 40, various servers 620 for storing data and supplying the data to the facilities to conduct management and operation within the wireless communication system 1, and a control unit 680 for controlling the whole maintenance center 60.

The control unit 680 includes a CPU 630 serving as a processor for controlling operation of the whole maintenance center 60, an MM 640 serving as a memory for storing an operation program and various data required for the operation, and an I/O 650 for transmitting/receiving signals to/from an external device, and an input/output unit 660 at which a maintenance engineer inputs/outputs signals required for management and operation.

In the present embodiment, the input/output unit 660 includes a keyboard 661, a display 662, a speaker 663 and a mouse 664. However, the input/output unit 660 may include other devices as well.

A control line 670 connects the above-described blocks 600 to 664 to each other.

The various servers 620 includes various servers such as a mail server 621 for activating a test of the wireless communication system 1 and collecting a test result, and a test server 622 for storing various test procedures, data and signals required to make a test of the wireless communication system 1 and providing them for the facilities in the system at the time of test. As a matter of course, the configuration and function of the servers are nothing but an example. A configuration of implementing the test with one server may be adopted. Or a configuration in which a large number of servers share in performing a test function described hereafter may be adopted. A configuration in which the various servers 620 are placed outside the maintenance center 60 may be adopted. Or a configuration in which connection to servers provided by an ISP (Internet Service Provider) is conducted to use the servers may be adopted. In this case, control of the PSTN 40 might be needed in the process of the test in order to switch the connection between the terminal 55 and the maintenance center 60 over to the connection between the terminal 55 and a server.

Figure 6:
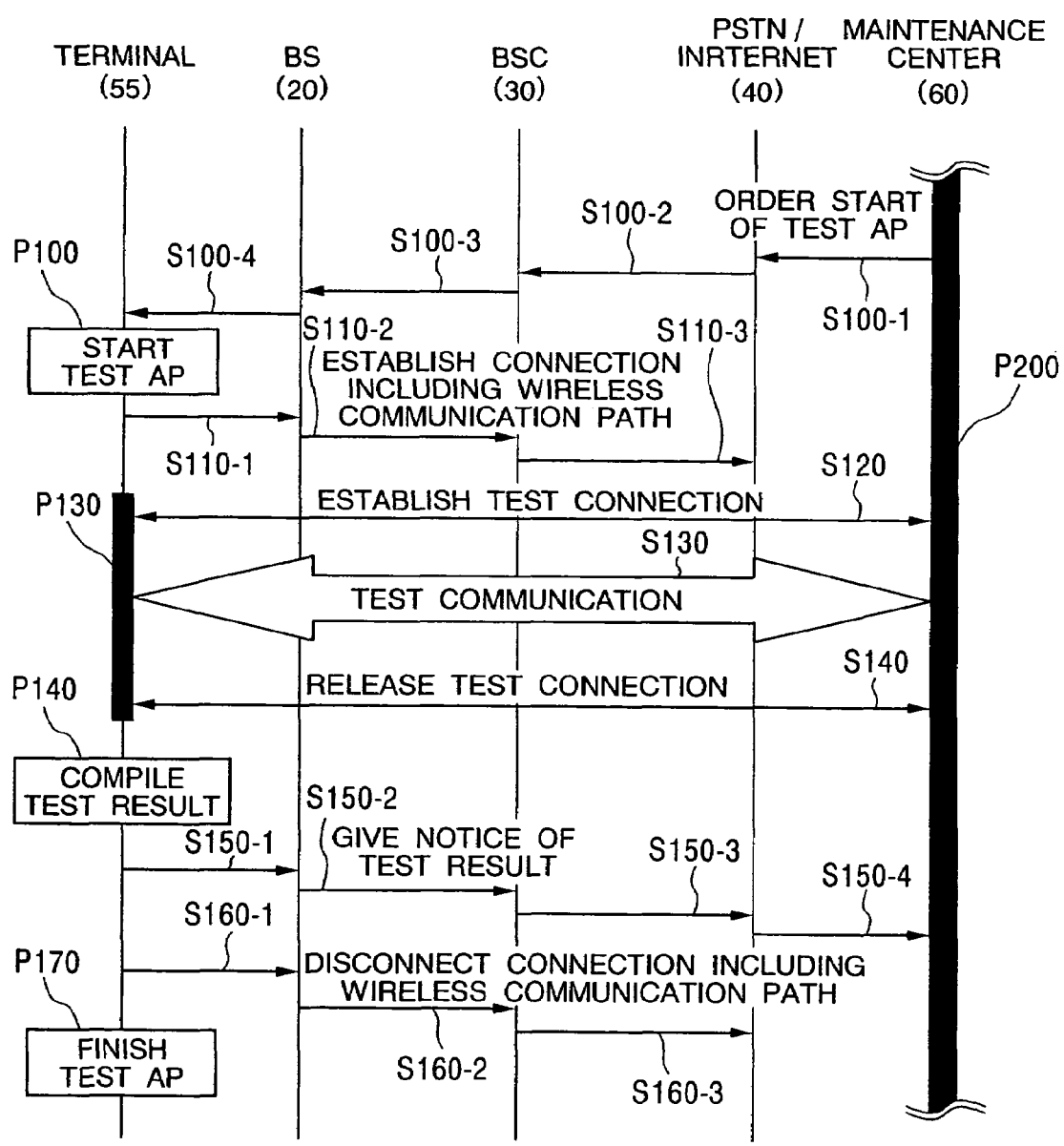
FIG. 6 is a sequence diagram showing an operation example of a wireless communication system.

FIG. 6 is a sequence diagram showing an operation example of the wireless communication system 1. An outline of operation is shown by taking the case where a test of the wireless communication system 1 is made by using the terminal 55-1 as an example.

Hereafter, the outline of the test operation will be described with reference to FIGS. 1 to 5.

If the maintenance center 60 orders the test of the wireless communication system 1 (the BSC 30—the BS 20—the cell 10-1), the control unit 680 orders the terminal 55-1 placed in the cell 10-1 to activate the test APp 543-$p$ (S100-1 to S100-4). Specifically, the maintenance engineer inputs a telephone number and a mail address provided for the terminal 55-1, at the keyboard 661, and orders activation of the test APp 543-$p$, or a timer (not illustrated) provided in the control unit periodically orders activation of the test APp 543-$p$.

While a configuration that passes by way of the PSTN 40 is shown in FIG. 6, a configuration that does not pass by way of the PSTN 40 but passes directly by way of the BSC 30 may be used.

Upon activating the test APp 543-$p$ (P100), the terminal 55-1 establishes a connection including a wireless communication path formed between the terminal 55-1 and the BSC 30 (S110-1 to S110-3).

Thereafter, the test APp 543-$p$ in the terminal 55-1, and a test program and the test server 622 in the maintenance center 60 operate (P130 and P200), and a test connection is established between the terminal 55-1 and the maintenance center 60 (S120). Test communication (transmission and reception of control signals and test signals) using the test connection is conducted, and a test of the wireless communication system 1 (the terminal 55-1—the cell 10-1—the BS 20-1—the BSC 30 (—PSTN 40)) is executed (S130).

Upon termination of the test, the test connection is released in response to an order issued by the terminal 55-1 or the maintenance center 60 (S140). A concrete test operation and a configuration example of the test program will be described in detail separately with reference to the drawings.

After compilation of the test result (P140), the terminal 55-1 gives a notice of the test result to the maintenance center 60 (S150-1 to S150-4), disconnects the connection including the wireless communication path (S160-1 to S160-3), and finishes the APp 543-$p$ (P170).

Figure 7:
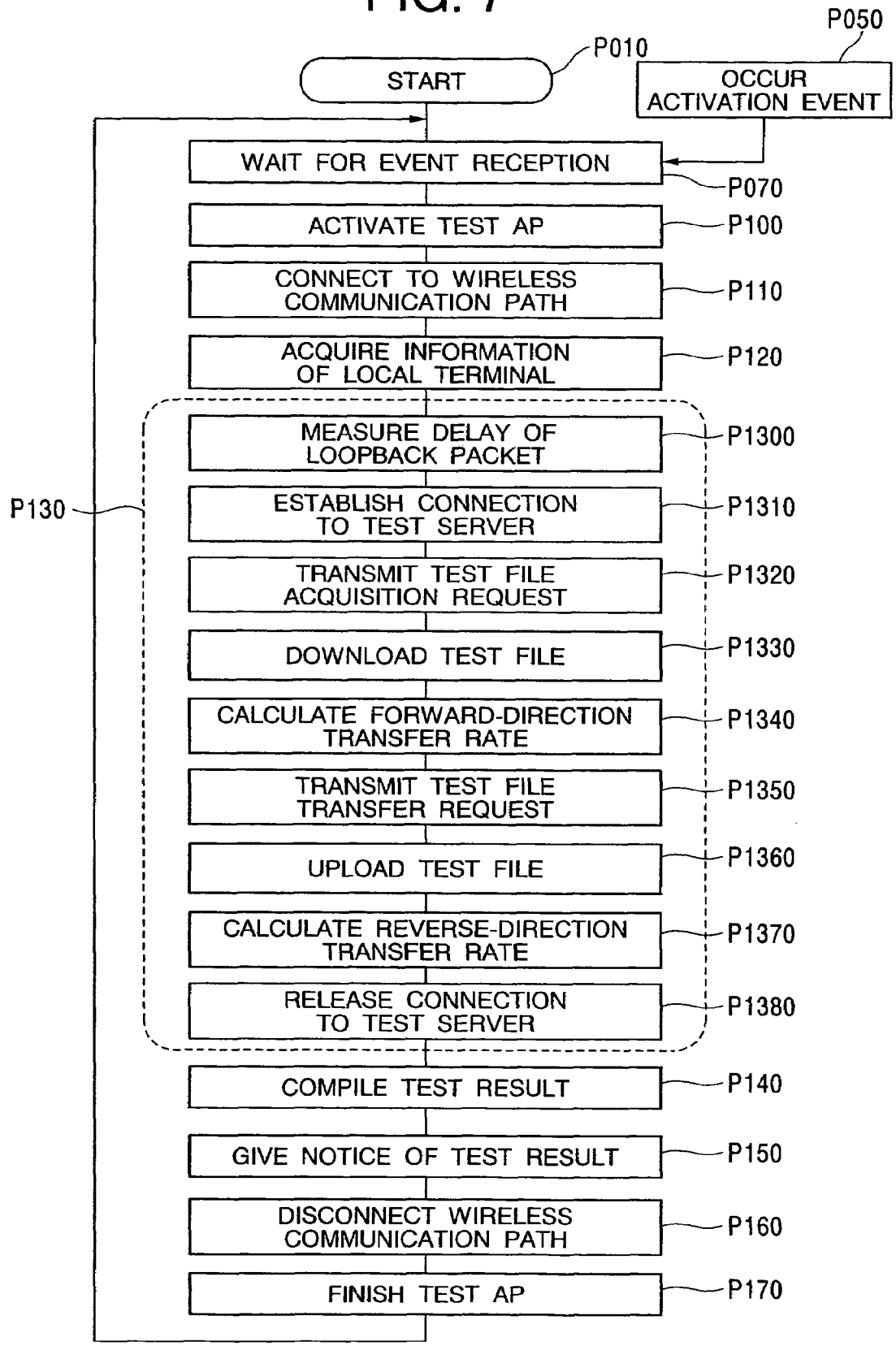
FIG. 7 is a flow diagram showing a configuration example of a test AP in a terminal.
Figure 8:
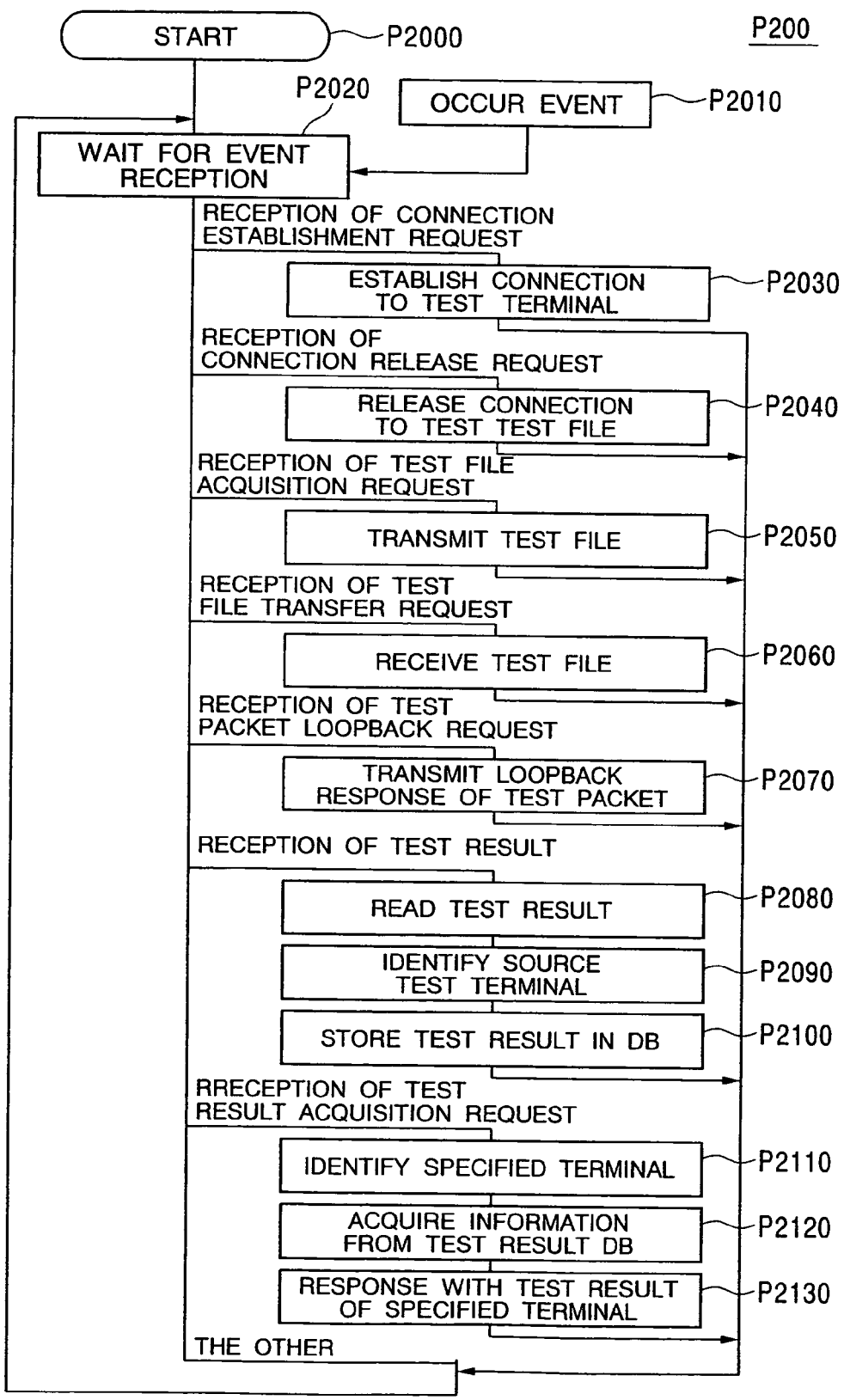
FIG. 8 is a flow diagram showing a configuration example of a test program installed in a maintenance center.

FIG. 7 is an example of a flow diagram of the test APp 543-$p$ in the terminal 55. FIG. 8 is an example of a flow diagram of the test program included in the maintenance center 60. FIG. 9 is a sequence diagram showing an example of test operation conducted between the terminal 55 and the maintenance center 60. In addition, FIG. 10 is a memory configuration diagram showing a configuration example of data relating to the test, stored in the memory in the terminal 55. FIG. 11 is a memory configuration diagram showing a configuration example of data relating to the test, stored in the memory or the server 620 (the test server 622) in the maintenance center 60.

Hereafter, an example of test operation of the wireless communication system 1 will be described in detail with reference to the drawings.

As described earlier, the power supply of the terminal 55 is always in the on-state (P010 in FIG. 7). The terminal 55 is thus ready to receive an activation order issued by the maintenance center 60 (P070 in FIG. 7). In this state, the terminal 55 receives an activation order issued by the maintenance center 60 (S100-1 to S100-4 in FIG. 6), and generates an activation event (P050 in FIG. 7). And the terminal 55 activates the test APp 543-*p* (P100 in FIGS. 6 and 7), and establishes the connection including the wireless communication path setting (P110 in FIG. 7 and S110-1 to S110-3 in FIG. 6). In addition, the terminal 55 acquires information of the local terminal, such as a telephone number, a mail address and identification information of an acquired pilot signal, and stores the information in the MM (560 in FIG. 2A) (P 120 in FIG. 7 and 5610 and 5611 in FIG. 10).

The stored information is transmitted to the maintenance center 60 during execution of the test program (P130 in FIG. 7), and stored in the test server (622 in FIG. 5) in the maintenance center (6210 and 6211 in FIG. 11).

In the test of the wireless communication system 1 (P130 in FIGS. 6 and 7), measurement of a packet delay is first conducted (P1300 in FIG. 7). Specifically, the terminal 55 generates (P1301 in FIG. 9) an ICMP echo packet (loopback packet) prescribed in RFC 792 in IETF (Internet Engineering Task Force) recommendations, and transmits the packet (S1300 in FIG. 9). The terminal 55 records transmission time at that time (P1302 in FIG. 9 and 5620 in FIG. 10). Upon receiving the loopback packet when the maintenance center 60 is in an event wait state (P2020 in FIG. 8), the maintenance center 60 generates a response packet (P2071 in FIG. 9) and transmits it to the terminal 55 (2070 in FIG. 8 and S1305 in FIG. 9). The terminal 55 records reception time of the response packet (P1303 in FIG. 9 and 5621 in FIG. 10), calculates delay time on the basis of the transmission time and the reception time, and records the delay time (P1304 in FIG. 9 and 5622 in FIG. 10). If the ICMP cannot be used due to limitations imposed on the APPF 542, for example, a function capable of looping back a packet may be substituted for it.

Subsequently, the terminal 55 establishes a test connection between it and the maintenance center 60 (S120 in FIG. 6, P1310 in FIG. 7, P2030 in FIG. 8, and S1310 and S1315 in FIG. 9), and measures the data transfer rate in the wireless communication system 1 (the terminal 55-1—the cell 10-1—the BS 20-1—the BSC 30 (—the PSTN 40)) as hereafter described.

By the way, the establishment of the test connection may be executed before the measurement of the packet delay. In the ensuing description of the test operation, it is supposed that the FTP prescribed in RFC 959 of the IETF recommendation is used. If the FTP cannot be used due to limitations imposed on the APPF 542 in the same way as the delay time measurement, a function equivalent to it may be substituted for it.

In data transfer rate measurement in a forward direction (from the BSC 30 to the terminal 55), the terminal 55 issues a test file acquisition request to the maintenance center 60 (P1320 in FIG. 7). Specifically, the terminal 55 transmits the acquisition request to the maintenance center 60 (S1320 in FIG. 9), and records time of the transmission as file acquisition start time (P1325 in FIG. 9 and 5630 in FIG. 10). Upon receiving the file transfer request when the maintenance center 60 is in an event wait state (P2020 in FIG. 8), the maintenance center 60 makes preparations for transfer of the requested file (P2051 in FIG. 9) and transmits a test file to the terminal 55. And the terminal 55 downloads the file (P1330 in FIG. 7, P2050 in FIG. 8 and S1321 in FIG. 9).

Upon completion of the file, the terminal 55 confirms a size of the received file. Upon receiving a file transfer completion response (S1325 in FIG. 9) from the maintenance center 50, the terminal 55 records time of the response reception as file acquisition end time together with the size of the received file (P1335 in FIG. 9, and 5631 and 5633 in FIG. 10). In addition, the terminal 55 calculates acquisition time and transfer rate on the basis of the file acquisition start time, the file acquisition end time, and the size, and records the transfer time and transfer rate (P1340 in FIGS. 7 and 9, and 5632 and 5634 in FIG. 10).

In data transfer rate measurement in a reverse direction (from the terminal 55 to the BSC 30), the terminal 55 issues a test file transfer request to the maintenance center 60 (P1350 in FIG. 7). Specifically, the terminal 55 transmits the transfer request to the maintenance center 60 (S1350 in FIG. 9), and records time of the transmission as file transfer start time (P1355 in FIG. 9 and 5640 in FIG. 10). Thereafter, the terminal 55 transmits (uploads) a test file to the maintenance center 60 (P1360 in FIG. 7 and S1360 in FIG. 9). Upon completion of the file transfer, the terminal 55 transmits a completion response as well (S1365 in FIG. 9) and records time of the transmission as file transfer end time (P1365 in FIG. 9 and 5641 in FIG. 10).

The terminal 55 may be configured to record a size of the transmission file after the completion of file transfer (5643 in FIG. 10). Upon receiving the file transfer request in an event wait state (P2020 in FIG. 8) during this time, the maintenance center 60 makes preparations for reception of the requested file (P2061 in FIG. 9) and receives the test file from the terminal 55 (P2060 in FIG. 8 and S1360 in FIG. 9). The terminal 55 calculates transfer time and transfer rate on the basis of the recorded file transfer start time, the file transfer end time, and the size, and records the transfer time and transfer rate (P1370 in FIGS. 7 and 9, and 5642 and 5644 in FIG. 10).

An example of the measurement and calculation of the average data transfer rate has been described heretofore. As for kinds of the data transfer rate, there are transfer rates of various definitions such as an average transfer rate and a peak transfer rate. Therefore, a transfer rate required for the actual test may be selected for the measurement and calculation, according to the configuration and operation method of the wireless communication system 1. Specifically, a configuration in which a specific rate measuring and calculating method is set previously in the APp 543-*p* in the terminal 55 may be adopted. Or a configuration in which the maintenance center 60 can select a necessary measuring and calculating method from some methods may be adopted. If there are necessary measurement (test) items besides the transfer delay, a necessary program may be added to the APp 543-*p* in the terminal 55. The maintenance center 60 also may have a program that can execute events that can be processed and that are associated with these items.

In other words, the wireless communication system 1 according to the present invention conducts transmission and reception of test control signals and test signals between a terminal 55 obtained by adding an AP to a general terminal and the maintenance center 60, by using the BS and BSC used in the general wireless communication system. Therefore, the wireless communication system according to the present invention can execute a test of the wireless communication system by using a low-cost configuration using a terminal and an apparatus generally used in wireless communication systems and a simple procedure, without introducing a special apparatus into the wireless communication system.

As a matter of course, the test method of the wireless communication system according to the present invention is not restricted to the measurement and calculation of the packet delay and the average data transfer rate. For example, confirmation of normal performance of paging operation may be conducted. If a test program that conducts on-hook and off-hook operation of voice communication is generated, the normal performance confirmation of the voice communication is also possible.

If the measurement of the data transfer rate is finished, the test connection is released (S140 in FIG. 6, P1380 in FIG. 7, P2040 in FIG. 8, and S1380 and S1385 in FIG. 9). The terminal 55 compiles data such as a test result recorded in the MM 560 (5600 in FIG. 10), and conducts giving a notice to the maintenance center 60 (S150-1 to S150-4 in FIG. 6 and P150 in FIG. 7), disconnection of the connection including the wireless communication path (S160-1 to S160-3 in FIG. 6 and P160 in FIG. 7), and termination of the test APp 543-$p$ as described earlier with reference to FIG. 6.

The terminal 55 compiles the data such as the test result as shown in FIG. 10 so as to generate data in a transmission form generally handled in the wireless system, such as a mail transmission form, and sends the compiled data to the mail server 621 in the maintenance center 60 (P140 and S150-1 to S150-4 in FIG. 6, and P140 and P150 in FIG. 7).

Upon receiving the data such as the test result transmitted from the terminal 55 when the maintenance center 60 is in the event wait state (P2020 in FIG. 8), the test server 622 reads these data (P2080 in FIG. 8), and identifies the transmission source test terminal 55 (P2090 in FIG. 8). The reason why the identification is conducted is as follows: the test terminal 55 is a terminal obtained by merely adding an AP to the general terminal 50; a general terminal 50 can also access the maintenance center for the purpose of, for example, grievance procedure; therefore, it is necessary to prevent mischief and false connection using impersonation of a terminal and thereby ensure the system security.

As a matter of course, it is possible in the wireless communication system 1 to execute measures for ensuring securities to, for example, prevent the test terminal 55 from conducting communication (transmission and reception) with an apparatus other than the maintenance center 60.

Upon confirming the reception of the test result transmitted from the terminal 55, the test server 622 stores the test result in a database (DB 6220 which is not illustrated) having a configuration as shown in FIG. 11 in order to use it in the maintenance center 60 for ensuing test of the wireless communication system 1 (P2100 in FIG. 8). Although omitted in the foregoing description of the test operation, the test file and information of the test terminal are also stored in the DB 6220 in the test server 622. As a matter of course, the configuration and functions of the servers represent nothing but an example as described earlier. A configuration in which these functions are implemented by one server, or a configuration in which the functions are distributed among a large number of servers may be adopted. A configuration in which various servers are placed outside the maintenance center 60 may be adopted. Or a configuration in which connection to servers provided by the ISP is conducted via a communication network such as the Internet to use the servers may be adopted.

The maintenance center 60 makes a test of the wireless communication system 1 on the basis of contents stored in the DB 6220. Specifically, if a test place (for example, the terminal 55-1—the cell 10-1—the BS 20-1—the BSC 30) is specified by an acquisition issued by the input/output unit 660 (in response to, for example, operation of the keyboard 661 conducted by the maintenance engineer, or a result of periodical test using a timer (not illustrated) based on the CPU 630 and the operation program in the MM 640), the maintenance center 60 determines whether requested contents are correct (P2110 in FIG. 8). If the requested contents are correct, the maintenance center 60 acquires necessary information from the DB 6220 (2120 in FIG. 8), and outputs the specified test result by displaying it on the display 662 or taking it into the MM 640 (P2130 in FIG. 8).

The wireless communication system 1 conducts various kinds of connection control to maintain the quality of communication service in general operation (for example, communication between a terminal 50 and the PC 51 via the BC, the BSC and the PSTN). A result of the various kinds of control and the state of the communication system are stored in the BS 20, the BSC 30 or the maintenance center 60. For example, when the terminal 50-1-1 conducts data transmission and reception with the PC 51, the terminal 50-1-1 is permitted to conduct data transfer to the PC 51 on the basis of the situation such as the radio wave state (C/I (Carrier to Interference Ratio)) at the local terminal in the cell 10-1, the number of other communicating terminals (such as 50-1-$n$), and data transfer rates already permitted for those terminals. Data transfer (communication) is conducted between the terminal 50-1-1 and the BS 10-1 at the permitted data transfer rate. And these kinds of setting and state information can be collected in the maintenance center 60 in the same way as the test result.

The test terminal 55-1 also has the test APp 543-$p$ similar to the general AP, installed therein. Although the connection destination is the maintenance center 60, the test terminal 55-1 can conduct communication (test operation) via the cell 10-1, the BS 20-1 and the BSC 30 in the same way as the general terminals. Therefore, the test of the wireless communication system 1 can be executed as hereafter described, without introducing a special apparatus into the wireless communication system.

If the maintenance center 60 orders the test terminal 55 to activate an AP, the test APp 543-$p$ in the test terminal 55 is activated. In the same way as the general terminals 50, the data transfer rate is set and test connection is established between the terminal 55-1 and the maintenance center 60 via the BC 20-1 and the BSC 30 on the basis of the situation such as the radio wave state (C/I), the number of other communicating terminals (such as 50-1-$n$), and the data transfer rates already permitted for those terminals. If the test operation as described above is conducted in the state in which the test connection is established, the packet delay and the data transfer rate in actual communication are derived. This cannot be executed in the conventional wireless communication system 1. In other words, confirmation of the normal performance and detection of abnormality occurrence can be conducted in the wireless communication system 1 by comparing values and state information set as the ordinary operation of the wireless communication system 1 with the test result obtained in actual use of the wireless communication system 1.

For example, after update or upgrade of software or a hardware change (replacement) is executed in the BS 10-1 providing packet communication service of the best-effort type, the packet delay is measured. If a delay (3 ms) longer than a set (supposed) delay (for example, within 500 μS) is measured, or if file uploading can be conducted only at a transfer rate (70 kbps) lower than a set (supposed) data transfer rate (for example, 128 kbps), then it can be assumed that some trouble has occurred in the BS 10-1 updated in software or the tuning of the set value is not suitable, as a result of the test. Since maintenance work can be conducted on the basis of such a test before complaints from users are reported, it becomes consequently possible to improve the service quality.

Specifically, the set (supposed) values and the values stored in the DB 6220 may be displayed on the display 662 so as to make it possible for the maintenance engineer to determine whether the values are proper. Or a configuration in which the values are compared and if an abnormality is judged to be present the maintenance center is notified to that effect may be adopted. If the values or state information set as the operation of the wireless communication system 1 cannot be obtained in the maintenance center 60, reference values used for the test may be previously set in the maintenance center 60 so as to make it possible to compare them with the contents of the DB.

Furthermore, on the basis of the CPU 630 and the operation program in the MM 640, statistical processing (for example, such as average acquisition, variance acquisition, and predicted value acquisition using interpolation or extrapolation) is executed on the periodically obtained test result and set (predicted) values. Since degradation in the BS 10-1 can also be tested by comparing them, preventive maintenance of the wireless communication system is implemented. For example, a phenomenon that the packet delay gradually becomes long and is predicted to exceed a predetermined allowed value, a phenomenon that the actual data transfer rate gradually falls, and a phenomenon that a deviation from the set (predicted) transfer rate becomes great can be detected in the maintenance center 60. Since these phenomena can be detected, it becomes possible to maintain the reliability, security and serviceability of the wireless communication system 1 by taking a preventive maintenance measure such as replacement of the BS 10-1 before a serious failure occurs.

In the foregoing description, it has been supposed that the test place is the terminal 55-1—the cell 10-1—the BS 20-1—the BSC 30. However, it is also possible to set the test place to the terminal 55-1—the sector 10-1-x—(the cell 10-1)—the BS 20-1—the BSC 30. In this case, the I/O 270 in the BS 20 may be connected to the I/O 570 in the terminal 55 and the BS 20 control for specifying a sector in the test operation may be executed.

In addition, in the wireless communication system 1 according to the present invention, the test can be executed by using the test terminal 55 obtained by merely adding the test AP to a movable general terminal 50. Therefore, it is easy to place a plurality of test terminals 55 in one cell (or sector). By doing so, it is possible to make a test on the serviceability of the wireless communication system 1 to a plurality of terminals. Since the overload state can be generated easily, the overload state can be used in performance measurement of the wireless communication system 1.

The configuration and test method (operation) of the wireless communication system 1 are nothing but an example. Other wireless communication systems and their test methods are incorporated in the scope of the present invention so long as a terminal having a test program and a maintenance center cooperate to make a test of the wireless communication system.

According to a wireless communication system according to the present invention and its test method, and an access terminal used for test of the wireless communication system, a wireless communication system, and method, capable of executing a test of a wireless communication apparatus from a remote place by using a generally used terminal without introducing a special apparatus can be implemented with a simple low-cost configuration and a simple procedure.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication system in which a general wireless communication terminal that is present in one or more coverage areas of a plurality of wireless communication apparatuses executes a first program provided in the general wireless communication terminal and conducts communication with another wireless communication terminal via a communication network connected to one of the wireless communication apparatuses associated with the general wireless communication terminal, said wireless communication system comprising:

a maintenance apparatus for the wireless communication system; and at least one second wireless communication terminal placed in one of the coverage areas of the plurality of wireless communication apparatuses, said coverage area selected as a test area for making a test of the wireless communication system, wherein said second wireless communication terminal is a general wireless communication terminal and includes an application program for testing the wireless communication system that is downloaded from the maintenance apparatus after said second wireless communication terminal is placed in said coverage area, wherein said maintenance apparatus activates said second wireless communication terminal at regular intervals or based on a instruction from a user of the maintenance apparatus, wherein when said maintenance apparatus activates said second wireless communication terminal, said second wireless communication terminal activates the application program, executes communication with said maintenance apparatus, and makes a test of said wireless communication system, and wherein the test comprises performing either a first series of steps or a second series of steps at the second wireless communication terminal, the first series of steps comprising:

generating a loopback packet, transmitting the loopback packet to the maintenance apparatus, and recording a transmission time at which the loopback packet is transmitted;

receiving a reply packet generated in response to the loopback packet from the maintenance apparatus and recording a reception time at which the reply packet is received;

diagnosing the wireless communication system by calculating a delay time from the transmission time and the reception time and obtaining a packet delay in the wireless communication system; and transmitting a result of diagnosing the wireless communication system to the maintenance apparatus;

the second series of steps comprising:

transmitting a request for a test file to the maintenance apparatus and recording a transmission time at which the request for the test file is transmitted as a file acquisition staff time;

receiving the test file and a file transmission completion response from the maintenance apparatus in response to the request and recording a file size of the received test file and a reception time at which the file transmission completion response is received as a file acquisition completion time; and measuring a data transfer rate to diagnose the wireless communication system by calculating a file transfer time and a file transfer rate based on the file acquisition start time, file acquisition completion time, and the file size of the received test file.

2. A test method for a wireless communication system in which a general wireless communication terminal that is present in one or more coverage areas of a plurality of wireless communication apparatuses executes a program provided in the general wireless communication terminal and conducts communication with another wireless communication terminal via a communication network connected to one of the wireless communication apparatuses associated with the general wireless communication terminal, said test method for wireless communication system comprising the steps of:

placing at least one specified wireless communication terminal in one of the coverage areas of the plurality of wireless communication apparatuses, said coverage area selected as a test area for making a test of the wireless communication system;

providing the specified wireless communication terminal with a test program for the wireless communication system, wherein the specified wireless communication terminal is a general wireless communication terminal and receives the test program by downloading it from a maintenance apparatus in the wireless communication system after being placed in said coverage area; and activating the test program, using the specified wireless communication terminal, to establish connection between the specified wireless communication terminal and the maintenance apparatus and to execute transmission and reception of control signals and test signals between the specified wireless communication terminal and the maintenance apparatus, wherein the test program is activated by said maintenance apparatus at regular intervals or based on a instruction from a user of said maintenance apparatus, and wherein the test program causes the specified wireless communication terminal to perform either a first series of steps or a second series of steps, the first series of steps comprising:

generating a loopback packet, transmitting the loopback packet to the maintenance apparatus, and recording a transmission time at which the loopback packet is transmitted;

receiving a reply packet generated in response to the loopback packet from the maintenance apparatus and recording a reception time at which the reply packet is received;

diagnosing the wireless communication system by calculating a delay time from the transmission time and the reception time and obtaining a packet delay in the wireless communication system; and transmitting a result of diagnosing the wireless communication system to the maintenance apparatus;

the second series of steps comprising:

transmitting a request for a test file to the maintenance apparatus and recording a transmission time at which the request for the test file is transmitted as a file acquisition start time;

receiving the test file and a file transmission completion response from the maintenance apparatus in response to the request and recording a file size of the received test file and a reception time at which the file transmission completion response is received as a file acquisition completion time; and measuring a data transfer rate to diagnose the wireless communication system by calculating a file transfer time and a file transfer rate based on the file acquisition start time, file acquisition completion time, and the file size of the received test file.

3. A wireless communication terminal used in a test of a wireless communication system in which the wireless communication terminal is present in one or more coverage areas of a plurality of wireless communication apparatuses, executes an application program provided in the wireless communication terminal and conducts communication with another wireless communication terminal via a communication network connected to one of the wireless communication apparatuses associated with the wireless communication terminal, said wireless communication terminal comprising:

an operating system for conducting basic operation of said wireless communication terminal;

a plurality of application programs;

an application platform for coordinating said operating system with said application programs; and a test program for said wireless communication system, wherein the wireless communication terminal is placed in one of the coverage areas of the plurality of wireless communication apparatuses, said coverage area selected as a test area for making a test of the wireless communication system;

wherein the wireless communication terminal is a general wireless communication terminal and receives the test program by downloading it from a maintenance apparatus in the wireless communication system after being placed in said coverage area, wherein said test program is activated by said maintenance apparatus at regular intervals or based on a instruction from a user of the maintenance apparatus, wherein when activated by said maintenance apparatus, said test program operates on said operating system and said application platform and executes a test of said wireless communication system by conducting communication with said maintenance apparatus, and wherein said wireless communication terminal is configured to:

execute said test program by performing either a first series of steps or a second series of steps, the first series of steps comprising:

generating a loopback packet, transmitting the loopback packet to the maintenance apparatus, and recording a transmission time at which the loopback packet is transmitted;

receiving a reply packet generated in response to the loopback packet from the maintenance apparatus and recording a reception time at which the reply packet is received;

diagnosing the wireless communication system by calculating a delay time from the transmission time and the reception time and obtaining a packet delay in the wireless communication system; and transmitting a result of diagnosing the wireless communication system to the maintenance apparatus;

the second series of steps comprising:

transmitting a request for a test file to the maintenance apparatus and recording a transmission time at which the request for the test file is transmitted as a file acquisition staff time;

receiving the test file and a file transmission completion response from the maintenance apparatus in response to the request and recording a file size of the received test file and a reception time at which the file transmission completion response is received as a file acquisition completion time; and measuring a data transfer rate to diagnose the wireless communication system by calculating a file transfer time and a file transfer rate based on the file acquisition staff time, file acquisition completion time, and the file size of the received test file;

compile a test result of said wireless communication system after completion of the test program, transmitting the compiled test result to said maintenance apparatus, and releasing the connection; and finish said test program.

4. The wireless communication system according to claim 1, further comprising:

a wireless communication apparatus controller which connects to the plurality of wireless communication apparatuses and another communication network, and controls the plurality of wireless communication apparatuses.

5. The wireless communication system according to claim 1, wherein:

the application program which tests the wireless communication system is an application program activated by an operating system provided in the general wireless communication terminal; and the application program which tests the wireless communication system is an application program that executes a test of said wireless communication system in cooperation with said maintenance apparatus via said wireless communication system.

6. The wireless communication system according to claim 1, wherein:

said maintenance apparatus comprises an interface to said wireless communication system, a control unit, and a server for transmitting/receiving test signals to/from the second wireless communication terminal; and when said control unit activates the second wireless communication terminal via said interface, transmission and reception of the test signals are conducted between the second wireless communication terminal and said server, and a test result measured by the second wireless communication terminal during the transmission and reception of the test signals is received and displayed on said control unit.

7. The wireless communication system according to claim 1, wherein the second wireless communication terminal is placed in a cell or a sector formed by each wireless communication apparatus.

8. The test method for the wireless communication system according to claim 2, further comprising the steps of:

confirming connection between the specified wireless communication terminal and the maintenance apparatus for the wireless communication system, and then executing transmission and reception of control signals and test signals between the specified wireless communication terminal and the maintenance apparatus; and compiling a test result of the wireless communication system after completion of the measurement, transmitting the compiled test result to the maintenance apparatus, and releasing the connection.

9. The test method for the wireless communication system according to claim 2, wherein the wireless communication system includes a wireless communication apparatus controller which connects to the plurality of wireless communication apparatuses and another communication network, and controls the plurality of wireless communication apparatuses.

10. The test method for the wireless communication system according to claim 2, wherein:

the test program is an application program activated by an operating system provided in the specified wireless communication terminal; and the test program executes a test of the wireless communication system in response to activation given by the maintenance apparatus via the wireless communication system.

11. The wireless communication terminal used in a test of said wireless communication system according to claim 3, wherein the wireless communication system includes a wireless communication apparatus controller which connects to the plurality of wireless communication apparatuses and another communication network, and controls the plurality of wireless communication apparatuses.

* * * * *